United States Patent
Moncrief et al.

(10) Patent No.: US 6,855,082 B2
(45) Date of Patent: Feb. 15, 2005

(54) POWER TRANSMISSION BELT

(75) Inventors: Darren Blaine Moncrief, Lincoln, NE (US); Delyn Marlowe Stork, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 155 days.

(21) Appl. No.: 10/213,179

(22) Filed: Aug. 6, 2002

(65) Prior Publication Data

US 2003/0050144 A1 Mar. 13, 2003

Related U.S. Application Data

(60) Provisional application No. 60/317,606, filed on Sep. 6, 2001.

(51) Int. Cl.$^7$ .............................. F16G 1/04; F16G 5/16
(52) U.S. Cl. ....................... 474/263; 474/260; 156/137
(58) Field of Search .................................. 474/263, 260, 474/268, 264, 237, 271; 524/397, 494, 495, 426; 156/137, 138; 525/404, 187

(56) References Cited

U.S. PATENT DOCUMENTS

| | | | |
|---|---|---|---|
| 3,661,823 A | 5/1972 | Fix et al. .................... 260/17.4 |
| 4,024,773 A | 5/1977 | Hartman et al. .............. 74/233 |
| 4,031,768 A | 6/1977 | Henderson et al. ........... 74/233 |
| 4,032,768 A | 6/1977 | Rieger ........................ 235/197 |
| 4,244,234 A | 1/1981 | Standley ..................... 474/263 |
| 4,464,153 A | 8/1984 | Brew ......................... 474/270 |
| 4,645,801 A | * 2/1987 | Barnhouse .................. 525/404 |
| 4,798,566 A | 1/1989 | Sedlacek .................... 474/238 |
| 5,284,456 A | 2/1994 | Connell et al. ............... 474/91 |
| 5,610,217 A | 3/1997 | Yarnell et al. .............. 524/397 |
| 6,177,202 B1 | 1/2001 | Takehara et al. ............ 428/515 |
| 6,220,972 B1 | 4/2001 | Sullivan et al. ............. 473/374 |
| 6,361,462 B1 | * 3/2002 | Takada et al. .............. 474/237 |
| 6,464,607 B1 | * 10/2002 | Rosenboom et al. ....... 474/263 |
| 2002/0042317 A1 | * 4/2002 | South ......................... 474/264 |
| 2003/0032514 A1 | 2/2003 | Edwards et al. ............ 474/263 |

FOREIGN PATENT DOCUMENTS

| | | | | |
|---|---|---|---|---|
| EP | 1 108 750 A | 6/2001 | .......... C08L/23/16 |
| EP | 1 241 379 A | 9/2002 | ............. F16G/5/20 |
| JP | 2003-297847 A | * 10/2000 | ............. F16G/5/16 |

* cited by examiner

Primary Examiner—Marcus Charles
(74) Attorney, Agent, or Firm—John D. DeLong

(57) ABSTRACT

An endless power transmission belt having
(1) a tension section;
(2) a cushion section; and
(3) a load-carrying section disposed between the tension section and cushion section; and the belt containing a free radically-cured elastomeric composition comprising the reaction product of
(a) an ethylene-alpha-olefin elastomer;
(b) from 10 to 100 parts by weight per 100 parts by weight of total rubber (phr) of a non-migratory internal lubricant selected from the group consisting of graphite, molybdenum disulfide, polytetrafluoroethylene and mixtures thereof; and
(c) from 0.1 to 100 phr of curative coagent selected from the group consisting of organic acrylates, organic methacrylates, metal salts of an alpha-beta saturated organic acid and mixtures thereof.

32 Claims, 1 Drawing Sheet

POWER TRANSMISSION BELT

CROSS REFERENCE TO RELATED APPLICATIONS

The Applicants hereby incorporate by reference prior U.S. Provisional Application Ser. No. 60/317,606, filed on Sep. 6, 2001.

BACKGROUND OF THE INVENTION

Higher temperatures in automotive underhood applications and customer demands for wider service temperature ranges and longer warranty periods have led to the need for belt elastomers with improved high and low temperature resistance. As a result, ethylene-alpha-olefin polymers have replaced polychloroprene as the primary elastomer for automotive multi-V-ribbed belt applications.

A known disadvantage of ethylene-alpha-olefin elastomers, however, is inferior wear resistance. A particular problem inherent to this type of elastomer is the tendency to undergo chain scission in response to dynamic loading and abrasive wear. In the case of multi-v-ribbed belts, this characteristic leads to what is referred to as "pilling", that is, the accumulation of sticky abraded material in the grooves of the belt. This phenomenon is a common source of underdesirable belt noise and, in extreme cases, can lead to catastrophic failure of the belt.

Several methods for improving the pilling resistance of ethylene-alpha-olefin belts are known and described in the prior art. One method for improving pilling resistance involves use of an ethylene-alpha-olefin elastomer with high ethylene content. One disadvantage of this approach is that high ethylene grades of these elastomers are difficult to process on the open mills and calenders typically used in the manufacture of power transmission belts. Ethylene-alpha-olefin elastomers with high ethylene content also exhibit poorer low temperature properties than comparable elastomers with low ethylene content due to high glass transition temperatures and a greater degree of crystallinity.

Another approach to improving pilling resistance of compounds based on ethylene-alpha-olefin elastomers is the incorporation of high tenacity and wear resistance fibers, particularly aramid fibers such as those sold under the trademarks Kevlar, Twaron and Technora. The use of such fibers to improve pilling resistance is described in a number of prior publications including Yarnell et al. (U.S. Pat. No. 5,610,217), Sedlacek (U.S. Pat. No. 4,798,566) and Takehara et al. (U.S. Pat. No. 6,177,202).

When the grooves of multi-V-ribbed belts incorporating such fibers are formed by cutting or grinding, a portion of these fibers are exposed and protrude from the rib surface. These fibers essentially function to minimize contact between the base elastomer and the belt pulley, rather than by enhancing the pilling resistance of the base elastomer itself. A major disadvantage to the use of such fibers, however, is their significantly higher cost relative to other fibers commonly used in power transmission belts. For example, the raw material cost for aramid fibers is typically more than 20 times the cost of suitable cotton fibers. In addition, aramide fibers are difficult to disperse effectively on typical rubber mixing equipment, thus requiring more extensive and higher cost mix procedures.

A third approach to overcoming the problem of pilling in multi-V-ribbed belts is to incorporate a material in the elastomer compound that will migrate to the surface of the belt rib and lubricate the contact portion between the belt and pulley. An example of this approach is the use of polysiloxane material described by Connell, et al. (U.S. Pat. No. 5,284,456). This method has several disadvantages, however. Reduced friction between the power transmission belt and pulley surfaces limits load carrying capability. Furthermore, the rate of migration of such materials is strongly dependent on environmental conditions, and the concentration on the belt surface is dependent both on environmental conditions and frequency of use. In automotive applications which require an extremely wide service temperature range and duty cycles, this leads to insufficient surface lubrication under some conditions and excess lubrication in others.

A critical property required of elastomeric compositions used in power transmission belting is the availability to transmit load under dynamic conditions. Compounds used in this application have therefore typically included high levels of reinforcing particulate fillers. Carbon black and silica are the two most commonly used reinforcing particulate fillers. These fillers, unfortunately, have several disadvantages when used in power transmission belts. On disadvantage is they cause a decrease in flex/fatigue resistance proportional to their level, due to increased strain energy input with each cyclic deformation. Another disadvantage of compounds with high levels of reinforcing particulate filler is an increase in compound hysteresis, which relates to the amount of energy dissipated by the compound under dynamic loading. High hysteresis compounds subject to dynamic loading exhibit greater heat buildup than compounds with lower hysteresis, accelerating the heat aging process and, therefore, leading to premature failure. High hysteresis compounds also exhibit poorer wear resistance, especially pilling, than comparable low hysteresis compounds.

The use of non-migratory internal lubricants in power transmission belts has been described, for example, by Brew (U.S. Pat. No. 4,464,153), Standley (U.S. Pat. No. 4,244,234) and Henderson et al. (U.S. Pat. No. 4,032,768). In all of these cases, the lubricant was used to reduce the co-efficient of friction between the belt and pulley. In many applications, particularly the multi-V-ribbed belts, co-efficient of friction needs to be kept above some minimum value corresponding to the design of the belt drive or customer requirements.

Due to the disadvantages associated with known methods of improving wear resistance and minimizing hysteresis in ethylene-alpha-olefin elastomers, while maintaining acceptable load carrying capability, there exists a need for an ethylene-alpha-olefin elastomer which will exhibit low hysteresis and good wear resistance, especially pilling, without requiring the use of high ethylene polymer, aramid fiber, migratory lubricants or high levels of reinforcing particulate filler. There further exists a need to meet these requirements without reducing the co-efficient of friction between the elastomer and standard belt pulleys.

SUMMARY OF THE INVENTION

The present invention relates to a power transmission belt that is characterized by a free radically cured elastomeric composition comprising the reaction product of an ethylene-alpha olefin elastomer, a non-migratory internal lubricant and a curative coagent.

BRIEF DESCRIPTION OF THE FIGURES

The accompanying figure shows embodiments of this invention in which

DETAILED DESCRIPTION OF THE INVENTION

Figure 1:
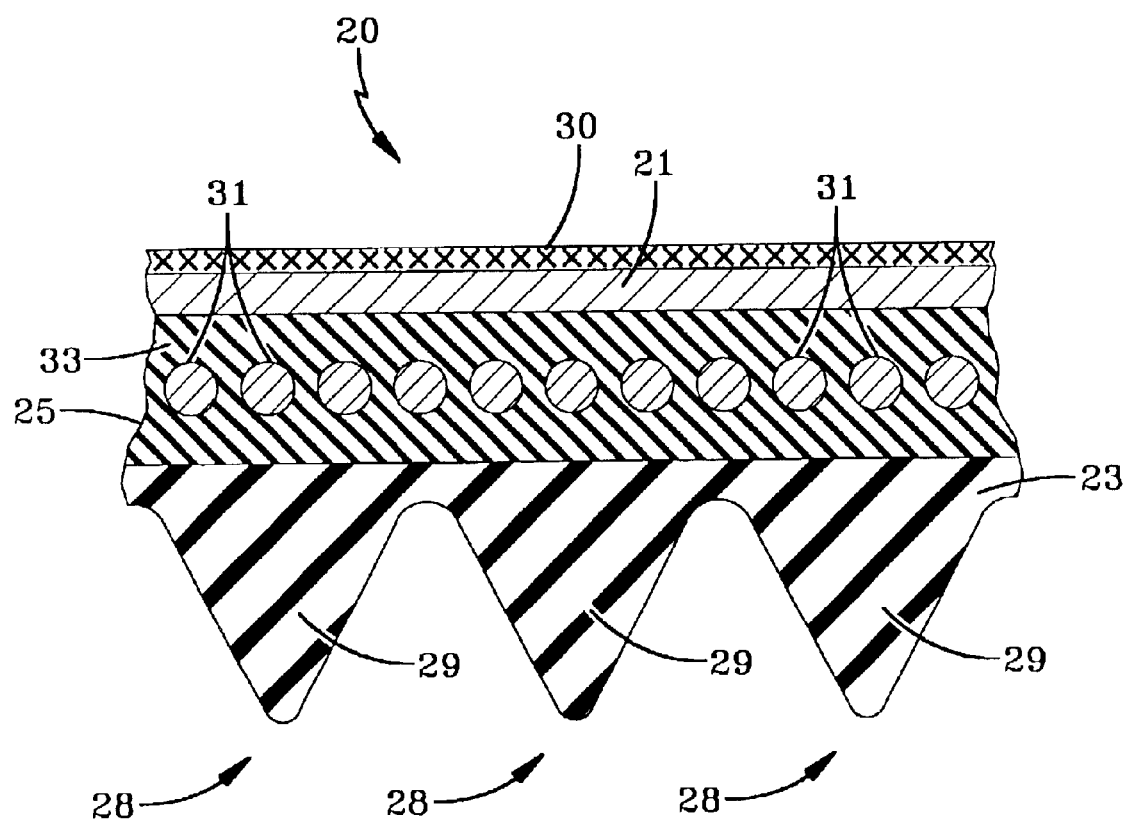
FIG. 1 is a fragmentary perspective view illustrating one embodiment of an endless power transmission belt of this invention.

There is disclosed an endless power transmission belt having
(1) a tension section;
(2) a cushion section; and
(3) a load-carrying section disposed between said tension section and cushion section; and the belt containing a free radically cured elastomeric composition comprising the reaction product of
  (a) an ethylene alpha olefin elastomer;
  (b) from 10 to 100 parts by weight per 100 parts by weight of total rubber (phr) of a non-migratory internal lubricant selected from the group consisting of graphite, molybdenum disulfide, polytetrafluoroethylene and mixtures thereof, and
  (c) from 0.1 to 100 phr of curative coagent selected from the group consisting of organic acrylates, organic methacrylates, metal salts of an alpha-beta unsaturated organic acid and mixtures thereof Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer (not shown), adhered to a drive surface 28 and three ribs (or "V's") 29 which are fabric-coated. The belt 20 of FIG. 1 has a fabric backing 30. The fabric backing 30 may be bi-directional, non-woven, woven or knitted fabric. The fabric-backing layer 30 may be frictioned, dipped, spread, coated or laminated.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be with fabric as described herein. Preferably, the belt 20 has one drive surface.

The elastomeric compositions for use in the tension section 21, cushion section 23 and load carrying section 25 may be the same or different.

The elastomeric composition for use in the tension section 21 and/or cushion section 23 and load carrying section 25 contains an ethylene-alpha-olefin rubber or elastomer. In addition to the ethylene-alpha-olefin rubber or elastomer, additional rubbers may be used. In one embodiment, from 50 to 100 parts by weight of the total rubber is an ethylene-alpha-olefin elastomer. Preferably, from 70 to 100 parts by weight is an ethylene-alpha-olefin elastomer. The ethylene-alpha-olefin elastomer includes copolymers posed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene, and pentene units and an unsaturated component, ethylene and octene units and an unsaturated component, as well as mixtures thereof. As the unsaturated component of the terpolymers, any appropriate non-conjugated diene may be used, including, for example, 1,4-hexadiene, dicyclopentadiene or ethylidenenorbornene (ENB). The ethylene-alpha-olefin elastotomer preferred in the present invention contains from about 35 percent by weight to about 90 percent by weight of the ethylene unit, from about 65 percent by weight to about 5 percent by weight of the propylene or octene unit and 0 to 10 percent by weight of the unsaturated component. In a more preferred embodiment, the ethylene-alpha-olefin elastomer contains from a out 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

When it is desired to use a rubber in addition to the ethylene alpha olefin elastomer, the additional rubber will range from zero to 50 parts by weight, of the total rubber used. Such rubber may be selected from the group consisting of silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, and mixtures thereof. Preferably, from zero to 30 parts by weight of the total 100 parts by weight of elastomer is one or more rubber listed above.

The elastomeric composition containing the ethylene-alpha olefin elastomer and an optional second rubber, may be used in the tension section, cushion section, load carrying section, two of these sections or all three section. Preferably, the elastomeric composition is used in the cushion section.

The elastomeric composition for use in the belt of the present invention contains a non-migratory internal lubricant. The term "non-migratory" is intended to exclude those lubricants which move or travel within the elastomeric matrix. Representative examples of such migratory lubricants which are excluded from the term "non-migratory" are oils, polysiloxanes, or waxes. The term internal is intended to mean that the lubricant is mixed or co-mingled in the ethylene-alpha-olefin rubber containing compound. Representative examples of suitable non-migratory internal lubricants for use in the present invention include graphite, molybdenum disulfide, polytetrafluoroethylene and mixtures thereof The graphite may be natural or synthetic. The level of non-migratory internal lubricant may vary from 10 to 100 phr. Preferably, the level will range from 10 to 60 phr, with a range of from 20 to 40 being the most preferred.

A free radical crosslinking reaction is used to cure the rubber containing composition in the belt. The reaction may be via UV cure system or peroxide cure system. Well-known classes of peroxides that may be used include diacyl peroxides, peroxyesters, dialkyl peroxides and peroxyketals. Specific examples include dicumyl peroxide, n-butyl-4,4-di (t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is 2,5-dimethyl-2,5-di(t-butylperoxy) hexane. Typical amounts of peroxide ranges from 0.1 to 12 phr (based on active parts of peroxide). Preferably, the amount of peroxide ranges from 2 to 6 phr.

A coagent is present during the free radical crosslinking reaction. Coagents are monofunctional and polyfunctional unsaturated organic compounds which are used in conjunction with the free radical initiators to achieve improved vulcanization properties. Representative examples include organic acrylates, organic methacrylates, metal salts of an alpha-beta unsaturated organic acid and mixtures thereof.

The coagent may be present in a range of levels. Generally speaking, the coagent is present in an amount ranging from 0.1 to 100 phr. The level of coagent will, of course, vary depending on the coagent used. Preferably, the coagent is present in an amount ranging from 20 to 60 phr.

As mentioned above, one class of coagents are acrylates and methacrylates. Representative examples of such coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris (2-hydroxy ethyl) isocyanurate triacrylate, tris (2-hydroxy ethyl) isocyanurate triacrylate, and tris (2-hydroxy ethyl) isocyanurate trimethacrylate.

The metal salts of α, β-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacylate and zinc dimethacrylate are preferred.

Conventional carbon blacks may also be present in the composition. Such carbon blacks are used in amounts ranging from 0 to 250 phr. One advantage of the present invention is the possible elimination of such reinforcing fillers. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N683, N754, N762, N907, N908, N990 and N991.

Various non-carbon black reinforcing fillers and/or reinforcing agents may be added to increase the strength and integrity of the rubber composition for making the power transmission belt of the present invention. Examples of reinforcing agents are silica, talc, calcium carbonate and the like. Such non-carbon black reinforcing agents may be used in amounts of from about 0 to 80 phr, and preferably about 0 to 20 phr.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

The elastomer composition may also have fibers or flock distributed throughout. The fibers or flock to be distributed throughout the elastomer mix may be any suitable material and is preferably non-metallic fibers such as cotton or fibers made of a suitable synthetic material include aramid, nylon, polyester, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 5 to 50 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied and followed by the fabric, if used. The assembled laminate or slab and drum are placed in a mold and cured. After cure, ribs are cut into the slab and the slab cut into belts in a manner known to those skilled in the art.

EXAMPLE I

Three samples were made from the recipes illustrated in Table 1. Sample 1 is considered a control due to the absence of a non-migratory internal lubricant. Sample 3 is considered a control due to the absence of the curative coagent. All ingredients, except the peroxide, were added in the non-productive stage of mixing.

TABLE 1

|  | Control Sample 1 | Sample 2 | Control Sample 3 |
|---|---|---|---|
| EPDM[1] | 100 | 100 | 100 |
| Zinc diacrylate[2] | 40 | 40 | 0 |
| Synthetic graphite[3] | 0 | 30 | 30 |
| Carbon black[4] | 30 | 0 | 0 |
| Cotton flock[5] | 20 | 20 | 20 |
| Antioxidant[6] | 2 | 2 | 2 |
| Peroxide[7] | 4 | 4 | 4 |

[1]Nordel IP 4640 is an EPDM rubber commercially available from Dupont Dow Elastomer Inc. and having 55 percent by weight of ethyl unit, 40 percent by weight of the propylene units and 5 percent by weight of the unsaturated component
[2]Saret 633 commercially available from Sartomer
[3]A625 commercially available from Asbury Graphite
[4]N220 carbon black
[5]Akroflock cotton which is commercially available from Akrochem Corporation
[6]Polymerized 1,2-dehydro-2,2,4-trimethylquinoline
[7]2,5-dimethyl-2, 5-di-(t-butylperoxy) hexane

TABLE 2

|  | Control Sample 1 | Sample 2 | Control Sample 3 |
|---|---|---|---|
| F43 pilling (1 to 10 with 10 = best)[1] | 7 | 8.25 | 5 |
| W57 durability flex (hours to failure)[2] | 296 | 347 | 298 |

[1]To measure resistance of pilling or groove fouling, the belts were subjected to a two pulley tests. The driver pulley measures 121 mm in diameter and the driven pulley is a truncated nylon idler with a diameter of 76 mm. The driver speed is 3500 RPM at 77° F. for 48 hours. There is a hanging weight of 160 pounds the belts are 6 ribbed belts with a length of 1200 mm. The belts are then visually rated on a scale of from 1 to 10 (10 equals best).
[2]Test specification No. SAE J1459

Control Sample 1 and Sample 2 are a comparison of carbon black to graphite. The graphite belt showed an increase in flex and durability and resisted pilling better than the carbon black loaded belt.

Sample 2 and Control Sample 3 are a comparison of ZDA versus non-ZDA graphite compounds. The non-ZDA compound showed a reduction in durability life and pilled much more severely on the pilling test.

While present exemplary embodiments of this invention and methods of practicing the same have been illustrated and described, it will be recognized that this invention may be otherwise variously embodied and practiced within the scope of the following claims.

What is claimed is:

1. An endless power transmission belt having (1) a tension section;

(2) a cushion section; and (3) a load-carrying section disposed between said tension section and cushion section; and the belt containing a free radically cured elastomeric composition comprising the reaction product of (a) an ethylene-alpha-olefin elastomer;

(b) from 10 to 100 parts by weight per 100 parts by weight of total rubber (phr) of a non-migratory internal lubricant selected from the group consisting of graphite, molybdenum disulfide, polytetrafluoroethylene and mixtures thereof; and (c) from 20 to 60 phr of curative coagent selected from the group consisting of organic acrylates, organic methacrylate; metal salts of an alpha-beta unsaturated organic acid and mixtures thereof.

2. The endless power transmission belt of claim 1 wherein said elastomeric composition comprising (1) 50 to 100 parts by weight of the ethylene-alpha-olefin elastomer; and (2) 0 to 50 parts by weight of the rubber selected from the group consisting of silicone rubber, polychloroprene, epichlorohydrin, acrylonitrice rubber, hydroge ted acrylonitrile rubber, zinc salts of unsaturated carboxylic acid ester grafted hydrogenated nitrile butadiene elastomer, natural rubber, styrene-butadiene rubber, ethylene-vinyl-acetate copolymer, ethylene methacrylate copolymers and terpolumers, chlorinated polyethylene, chlorosulfonated polyethylene, alkylated chlorosulfonated polyethylene, trans-polyoctenamer, polyacrylic rubber, and mixtures thereof.

3. The endless power transmission belt of claim 1 wherein said elastomeric composition has been cured with a peroxide selected from the group consisting of diacyl peroxides, peroxyesters, dialkyl peroxides and peroxyketals.

4. The power transmission belt of claim 3 wherein said peroxide is selected from the group consisting of dicumyl peroxide, n-butyl-4,4-di(t-butylperoxy) valrate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy) diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof.

5. The power transmission belt of claim 3 where said peroxide is present in an amount ranging from 0.1 to 12 phr.

6. The endless power transmission belt of claim 1 wherein the of internal non-migratory lubricant ranges from 10 to 60 phr.

7. The power transmission belt of claim 6, wherein said ethylene-alpha-olefin elastomer is ethylene-propylene diene terpolymer, the internal lubricant is graphite, and said curative coagent is selected from the group consisting of zinc diacrylate and zinc dimethacrylate.

8. The endless power transmission belt of claim 1 wherein the amount of internal non-migratory lubricant ranges from 20 to 40 phr.

9. The power transmission belt of claim 8, wherein said ethylene-alpha-olefin elastomer is ethylene-propylene diene terpolymer, the internal lubricant is graphite, and said curative coagent is selected from the group consisting of zinc diacrylate and zinc dimethacrylate.

10. The endless power transmission belt of claim 1 wherein the non-migratory lubricant is graphite.

11. The endless power transmission belt of claim 1 wherein 100 parts by weight of the rubber used in the elastomeric composition is the ethylene-alpha-olefin elastomer.

12. The power transmission belt of claim 11 wherein the cushion section contains fibers distributed throughout the elastomer composition.

13. The endless power transmission belt of claim 1 wherein said ethylene-alpha-olefin elastomer is ethylene-propylene diene terpolymer.

14. The endless power transmission belt of claim 1 wherein said elastomer composition is in the cushion section of the belt.

15. The endless power transmission belt of claim 1 wherein said elastomer composition is in the load-carrying section of the belt.

16. The endless power transmission belt of claim 15 wherein said coagent is a zinc salt of an alpha-beta unsaturated organic acid.

17. The endless power transmission belt of claim 1 wherein said elastomer composition is in the tension section of the belt.

18. The endless power transmission belt of claim 1 wherein said coagent is selected from the group consisting of organic acrylates, organic methacrylates, divinyl esters, divinyl benzene, bismaleimides, triallylcyanurate, polyallyl ethers and esters, a metal salts of an alpha-beta unsaturated organic acid and mixtures thereof.

19. The power transmission belt of claim 1 wherein said acrylate e coagent, methacrylate coagent and mixtures thereof is selected from the group consisting of di-, tri-, tetra- and penta-functional acrylates, di-, tri-, tetra- and penta-functional methacrylates and mixtures thereof.

20. The power transmission belt of claim 1 wherein the coagent is selected from the group consisting of zinc diacrylate, zinc dimethacrylate, calcium diacrylate, ethylene glycol dimethacrylate, diethylene glycol dimethacrylate, 1,3 butylene glycol dimethacrylate, cyclohexane dimethanol diacrylate, trimethylolpropane trimethacrylate and mixtures thereof.

21. The power transmission belt of claim 1 having one driving surface.

22. The power transmission belt of claim 21 wherein the drive surface of the belt is multi-V-grooved.

23. The power transmission belt of claim 1 wherein the drive s face of the belt is selected from the group consisting of flat, single V-grooved, multi-V-grooved and synchronous.

24. The power transmission belt of claim 1, wherein the amount of curative coagent ranges from 20 to 40 phr.

25. The power transmission belt of claim 24, wherein said ethylene-alpha-olefin elastomer is ethylene-propylene diene terpolymer, the internal lubricant is graphite, and said curative coagent is selected from the consisting of zinc diacrylate and zinc dimethacrylate.

26. The power transmission belt of claim 1, wherein said ethylene-alpha-olefin elastomer is ethylene-propylene diene terpolymer, the internal lubricant is graphite, and said curative coagent is selected from the group consisting of zinc diacrylate and zinc dimethacrylate.

27. An endless power transmission belt having
 (1) a tension section;
 (2) a cushion section; and
 (3) a load-carrying section disposed between said tension section and cushion section; and the belt containing a free radically cured elastomeric composition comprising the reaction product of
  (a) an ethylene-alpha-olefin elastomer;
  (b) from 10 to 100 parts by weight per 100 parts by weight of total rubber (phr) of a non-migratory internal lubricant selected from the group consisting of graphite, molybdenum disulfide, polytetrafluoroethylene and mixtures thereof; and
  (c) from 40 to 100 phr of curative coagent selected from the group consisting of organic acrylates, organic methacrylates, metal salts of an alpha-beta saturated organic acid and mixtures thereof.

28. The power transmission belt of claim 27, wherein said ethylene-alpha-olefin elastomer is ethylene-propylene diene terpolymer, the internal lubricant is graphite, and said curative coagent is selected from the group consisting of zinc diacrylate and zinc dimethacrylate.

29. The power transmission belt of claim 27, wherein said ethylene-alpha-olefin elastomer is ethylene-propylene diene terpolymer, the internal lubricant is graphite, and the curative coagent is zinc diacrylate.

30. An endless power transmission belt having
 (1) a tension section;
 (2) a cushion section; and
 (3) a load-carrying section disposed between said tension section and cushion section; and the belt containing a free radically cured elastomeric composition comprising the reaction product of
  (a) an ethylene-alpha-olefin elastomer;
  (b) from 20 to 40 parts by weight per 100 parts by weight of total rubber (phr) of a non-migratory internal lubricant selected from the group consisting of graphite, molybdenum disulfide, polytetrafluoroethylene and mixtures thereof; and (c) from 0.1 to 100 phr of curative coagent selected from the group consisting of organic acrylates, organic methacrylates, metal salts of an alpha-beta saturated organic acid and mixtures thereof.

31. The power transmission belt of claim 30, wherein said ethylene-alpha-olefin elastomer is ethylene-propylene diene terpolymer, the non-migratory internal lubricant is graphite, and said curative coagent is selected from the group consisting of zinc diacrylate and zinc dimethacrylate, and the amount of non-migratory internal lubricant ranges from 20 to 30 phr.

32. The power transmission belt of claim 31, wherein the curative coagent is zinc diacrylate and the amount of curative coagent ranges from 20 to 40 phr.

* * * * *